United States Patent [19]

Ohya et al.

[11] Patent Number: 4,771,423
[45] Date of Patent: Sep. 13, 1988

[54] MULTIPLEX TRANSMISSION SYSTEM

[75] Inventors: Harutada Ohya; Rumiko Akimoto, both of Tokyo; Katsutoshi Tagami, Saitama; Yoshikazu Tsuchiya, Saitama; Kazuo Nakamura, Saitama; Hayato Muneyuki, Saitama, all of Japan

[73] Assignees: Oki Electric Industry Co., Ltd.; Honda Giken Kogyo Kabushiki Kaisha, both of Tokyo, Japan

[21] Appl. No.: 839,781

[22] Filed: Mar. 13, 1986

[30] Foreign Application Priority Data

Mar. 12, 1985 [JP] Japan .................................. 60-48844
Mar. 12, 1985 [JP] Japan .................................. 60-48846

[51] Int. Cl.$^4$ .............................................. H04J 3/02
[52] U.S. Cl. ..................................... 370/86; 370/103; 340/825.05
[58] Field of Search .................... 370/86, 89, 90, 103, 370/100; 340/825.05

[56] References Cited

U.S. PATENT DOCUMENTS

| | | | |
|---|---|---|---|
| 4,156,798 | 5/1979 | Doelz | 358/257 |
| 4,510,494 | 4/1985 | Mizokawa et al. | 370/86 |
| 4,517,644 | 5/1985 | Hamada et al. | 370/86 |
| 4,536,876 | 8/1985 | Bahr et al. | 370/86 |

OTHER PUBLICATIONS

Susumu Hiraoka and Tetsuo Sugimoto, "Simplification of Automobile Wiring by Multiplex Harness", vol. 38, No. 2, pp. 215-221, 1984.

*Primary Examiner*—Douglas W. Olms
*Attorney, Agent, or Firm*—Bogucki, Scherlacher, Mok & Roth

[57] ABSTRACT

A multiplex transmission system (100) in which any ($N_i$) of a plurality of nodes ($N_l$–$N_n$) connected loop-like with a signal transmission path (1a, 1b) and each respectively connected to, for controlling, one of a plurality of electrical equipments is adapted for transmitting, in a given order (i) and in accordance with a time base ($\frac{1}{2}t_1$) that this node ($N_i$) itself has, a prepared signal ($A_i$, D) to the signal transmission path (1a, 1b) and for receiving prepared signal ($A_i$, D; $A_x$, D) from the signal transmission path (1a, 1b), wherein any ($N_i$) of the nodes ($N_l$–$N_n$) is adapted, at a time point ($r_2$, $r_3$) where this node ($N_i$) has received the prepared signal ($A_x$, D) from any other node ($N_x$) to have its own time base ($\frac{1}{2}t_1$) synchronized with the time base ($\frac{1}{2}t_1$) of the other node ($N_x$).

Any ($N_i$) of the nodes ($N_l$–$N_n$) further comprises a monitoring timer ($CNT_2$) adapted to have a monitoring time interval ($t_2$, $t_{i3}$, $t_{i4}$) set thereon at a predetermined time point (59, 62, 71, 84, 88), and is adapted to rise for transmitting the prepared signal ($A_i$, D) thereof to the signal transmission path (1a, 1b) when the monitoring timer ($CNT_2$) has timed up.

12 Claims, 5 Drawing Sheets

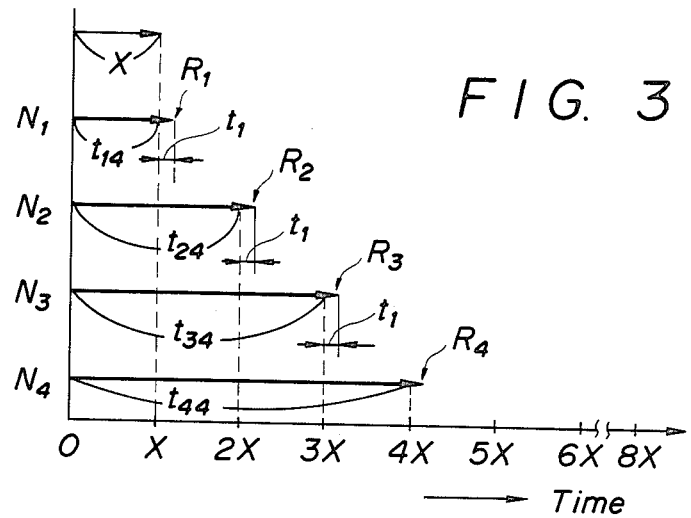
FIG. 3
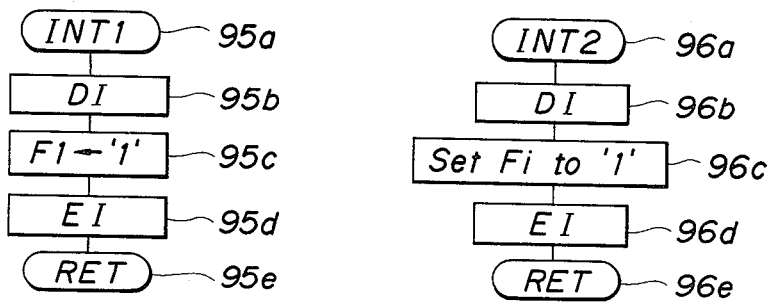
FIG. 4B
FIG. 4C
FIG. 5
| | Time up flag | appointing flag | function |
|---|---|---|---|
| $CNT_1$ | F1 | none | measuring Time base |
| $CNT_2$ | F2 | f2 | monitoring data D |
| | F3 | f3 | monitoring address Ai |
| | F4 | f4 | monitoring address Ai |

MULTIPLEX TRANSMISSION SYSTEM

BACKGROUND OF THE INVENTION

1. Field of the Invention

The present invention generally relates to a multiplex transmission system. More particularly, the invention relates to a multiplex transmission system of the type in which a plurality of units of electrical equipment and appliances disposed at various points of a vehicle, such as an air conditioner, a cruising controller, an intermittently operating wiper, and a variety of lamps, are connected loop-like by at least one wiring harness and besides the signal transmission and reception thereamong are effected in a multiplex manner through the wiring harness.

2. Description of Relevant Art

Recently, with an increase in the number of electrical equipment and appliances to be disposed at various points of a vehicle, the wiring harness for interconnecting such equipment and appliances tends to have an increased number of wires and hence to be enlarged in size, thus lowering the design feasibility, productivity, fittability, and maintainability of the wiring harness, while raising indirect costs such as for control and storage. In conjunction with such problems, there is a growing tendency to employ a multiplex transmission system in which a plurality of multiplex harness control devices (hereinafter called "nodes") are connected loop-like by at least one wiring harness and the signal transmission and reception thereamong is effected in a multiplex manner. Some examples of such multiplex transmission system for vehicles are disclosed in "Jidosha Gijutsu (Automobile Technology)" Vol. 38, No. 2, published 1984, at pages 215 to 221.

This reference includes comments on a number of types of multiple transmission system, as follows.

According to the reference, multiplex transmission systems are classified into several types by the system of multiplexing, control, communication, and synchronization.

As multiplexing systems, there are enumerated a time division system and a wavelength division system, besides others; the former being suitable for multiplexing those transmission systems in which a wiring harness is employed as a signal transmission line, and the latter, for those in which an optical fiber is employed as a signal transmission line.

As control systems, typically there are two: a centralized control system in which principally a single node is responsible for the control of an entire system, and a distributed control system in which the control of a system is equally shared among a plurality of nodes. However, as a hybrid of typical systems, there may well exist a variety of control systems that are unable to be fairly classified into either of the typical two categories.

As communication systems, generally there are two: a parallel line system in which a signal of address and a signal of detection and control data are transmitted through separated lines, and a serial line system in which such signals are transmitted through a single line. In either system, there is additionally provided a power line with which respective nodes are connected loop-like.

The serial line system usually appears as either a message system in which an address signal and a detection and control data signal are combined to be transmitted as a single message, or a time-slot system in which an address signal is omitted while transmitting a series of detection and control data signals in a predetermined sequence.

As synchronization systems, there are employed two: an internal clock system in which respective nodes have clocks thereof, and an external clock system in which a clock signal is generated at a particular node and supplied therefrom to other nodes. In the latter system, the particular that clock generator is adapted to generate and supply the clock signal is used to govern the other nodes. Thus, this system may well be regarded as a variation of the centralized control system.

In this respect, in the centralized system, an entire system may be shut down with troubles at a master node. As a control system for the multiplex transmission system, therefore, the distributed control system is preferred to be employed, though in this case there is a desideratum to be attained by devising a communication system to avoid confusion of signal transmission among respective nodes.

Incidentally, when performing control of a load as an electrical equipment or appliance, it sometimes becomes necessary to execute a logical process in addition to on-off control of a single switch. Exemplarily, in the case of a vehicle, there are adduced reasons such as that some loads are required to have their patterns of action selectable depending on various positions of an ignition switch, such as "on", "off", "park", and "lock" positions and some loads such as a tail lamp are needed to be operable for on-off control from a plurality of switches such as a tail switch and a parking switch.

For such reasons, in general, in a time-division multiplex transmission system according to a distributed control system, each node is constituted with: (1) a combination of a transmitter and a receiver connected both to a wiring harness; (2) a detection circuit such as a sensor or a switch put under control of the node; (3) a drive circuit such as a relay or a power switch for starting a load such as a pump or a lamp put under control of the node; (4) a logic circuit connected to the detection circuit and the drive circuit; (5) a combination of a multiplexer and a demultiplexer for interconnecting the logic circuit with the transmitter and the receiver; and (6) a control circuit connected to, to cooperate with, the multiplexer and the demultiplexer and adapted for signal transmission to and reception from the wiring harness.

In the accompanying drawings, FIG. 6 is a schematic representation of a time-division multiplex transmission system for vehicles of such a type as suggested from the level of art described.

In the FIG. 6, designated by reference character 200 is the multiplex transmission system, which employs a centralized control system as the control system, a message type serial line system as the communication system, and an internal clock system as the synchronization system.

The multiplex transmission system 200 is constituted with n ordinary nodes 200-1 to 200-n each respectively having such circuitries as (1)–(6) above, and a bidirectional or bilateral signal transmission path (wiring harness) consisting of a transmission line 211 with which the nodes 201 to 205 are connected loop-like.

The node 200-1 is now supposed to be a master node adapted to supply a polling signal to the remaining nodes 200-2 to 200-n.

In the multiplex transmission system 200, from the respective nodes 200-1 to 200-n various signals thereof are sequentially transmitted to the signal transmission line 211, in a controlled manner, which sequence of signal transmission is considered to be of such a system as shown in FIG. 7.

In this respect, each of the nodes 200-1 to 200-n shall be provided with an internal clock for measuring a time base Tb employed for timing the signal transmission, and adapted to transmit, of any data, 4 bits within the time interval of time base Tb. In general, data length is given in terms of a unit of 8 bits, which means each unit length of data is transmitted within a period of 2·Tb.

A situation is now considered, where, while a series of polling signals $P_i$ (i=2 to n) are sent from the master node 200 sequentially to the nodes 200-2 to 200-n, only the node 200-2 has no data signals to be then transmitted and will not transmit any data signal.

Incidentally, to avoid complicatedness, in FIG. 7, there are shown no more than those signals transmitted from nodes 200-1, 200-2, 200-3, and 200-4.

From the master node 200-1, a polling signal $P_2$ appointing the node 200-2 (of which signals are not shown) is first transmitted. The polling signal $P_2$ is a signal of 1 byte to be transmitted within the period 2·Tb.

After having transmitted the polling signal $P_2$, the master node 200-1 monitors, for a reception monitoring time Tm, whether or not signal transmission is performed from the node 200-2.

Such monitoring time Tm may preferably be determined to be the time base Tb times 2m (where m is an arbitrary integer, such that m≧2), in consideration of the necessary time till initiation of signal transmission from voluntary node 200-i to be appointed by a polling signal $P_i$. In the present case, the monitoring time Tm shall have such a relation to the time base Tb, that: Tm=4·Tb, while its length is measured by the internal clock of the master node 200-1.

When the monitoring time Tm has elapsed, the master node 200-1 judges that the node 200-2 will not perform signal transmission, and transmits signals including its own address $a_1$ and necessary data d.

The signals $a_1$ and d are supposed to be of a 1-byte length, respectively. Also the signals $a_1$ and d are transmitted, depending on the internal clock of the master node 200-1. The other nodes 200-2 to 200-n recieve the signals $a_1$ and d, to thereby execute their processes, as necessary.

After lapse of a monitoring time Tm' from transmission of the signals $a_1$ and d, the master node 200-1 transmits a polling signal $P_3$ identifying or appointing the node 200-3.

The node 200-3 receives the polling signal $P_3$ and, after lapse of a transmission monitoring time tm at the slave node side, tries to transmit signals of own address $a_3$ and necessary data d.

However, at the node 200-3, of which internal clock is not synchronized with that of the master node 200-1, an extra time $Tw_1$ is further consumed from the time point where the monitoring time tm has elapsed, before the node 200-3 transmits the signals of own address $a_3$ and necessary data d.

The signals $a_3$ and d are supposed to be of a 1-byte length, respectively. Also the signals $a_3$ and d are transmitted, depending on the internal clock of the node 200-3.

The master node 200-1 receives the signals $a_3$ and d, and executes necessary processes. The time required for such process generally is extremely short, when compared with the time base Tb.

After lapse of a monitoring time interval Tm" from reception of the signals $a_3$ and d, the master node 200-1 tries to transmit a polling signal $P_4$ appointing the node 200-4.

However, at the master node 200-1, of which internal clock is not synchronized with that of the node 200-4, an extra time $Tw_2$ is further consumed from the time point where the monitoring time Tm" has elapsed, before actual transmission of the polling signal $P_4$.

Here, it is supposed that the internal clock of the node 200-4 happens to be synchronized with that of the master node 200-1.

Therefore, the node 200-4 is permitted to transmit signals of own address $a_4$ and necessary data d after lapse of the transmission monitoring time tm at the slave node side from reception of the polling signal $P_4$.

Like this, in the multiplex transmission system 200, the transmission and reception of signal among the respective nodes 200-1 to 200-n are performed in a cyclic manner, on the basis of polling signal $P_i$ from the master node 200-1.

In the multiplex transmission system 200, however, on the signal transmission line 211 there are transmitted, in addition to signals of own address $a_i$ and data d from any of the nodes 200-1 to 200-n, the polling signal $P_i$ from the master node. As a result, the signal density of the signal transmission line 211 is relatively low.

In this respect, the signal transmission system 200 may advantageously be modified such that, depending on address signal $a_i$ from a certain node 200-i, the node 200-i+1 next to come for signal transmission is determined, while the order of signal transmission of the respective nodes 200-1 to 200-n is to be predetermined.

According to such modification, the polling signal $P_i$ becomes unnecessary, so that the signal density on the signal transmission line 211 can be all the more raised. Such modification may well be regarded as an introduction of the distributed control system.

However, even when such modification is applied to the multiplex transmission system 200, if the internal clocks of the nodes 200-1 to 200-n are not synchronized thereamong, there arises the problem that, upon signal transmission at the respective nodes 200-1 to 200-n, such time intervals as the extra times $Tw_1$ and $Tw_2$ of FIG. 7 are needed to be consumed again.

Moreover, in the multiplex transmission system 200, the order or time point of signal transmission of respective slave nodes 200-2 to 200-n is determined by the polling signal $P_i$ transmitted from the master node 200-1, thus accompanying such a problem that the entirety of the system 200 may malfunction with the polling signal $P_i$ kept from being transmitted in the event of malfunction of the master node 200-1. Even in the modification above, such problem may occur if any node is caused to malfunction.

The present invention has been achieved to effectively solve such problems of conventional multiplex transmission systems of the type described.

SUMMARY OF THE INVENTION

Accordingly, an object of the present invention is to provide a multiplex transmission system in which the density of signals on a signal transmission line can be favorably raised.

It is another object of the present invention to provide a multiplex transmission system which permits, even when any node gets out of order during operation of the system, the entire system to keep functioning.

According to the present invention, to achieve such object, there is provided a multiplex transmission system comprising a plurality of nodes each respectively connected to, control one of a plurality of units of electrical equipment, and a signal transmission path for loop-like connecting the nodes, in which any of the nodes comprises a transmitting means connected, for transmitting a prepared signal, to the signal transmission path, a receiving means connected to receive the prepared signal from the signal transmission path, a controlling means operatively connected to control the transmitting means and the receiving means and connected to, for controlling, corresponding ones of the units of electrical equipment, and a time base measuring means adapted to repeat measuring a time base as a basis of the signal transmission of the transmitting means to be controlled by the controlling means, and any of the nodes is adapted to perform signal transmission to the signal transmission path in a predetermined order, wherein any of the nodes further comprises a means adapted, when having received the prepared signal from any other node than this node, for resetting the time base measuring means of this node, to thereby make the time base of this node synchronized with that of the aforesaid any other node.

Preferably, any of the nodes further comprises a monitoring timer means adapted, at a predetermined time point, to have set thereon a monitoring time interval, and any of the nodes is adapted to rise or become active for transmitting the prepared signal to the signal transmission path when the monitoring timer means has timed up.

The above and further features, objects and advantages of the present invention will more fully appear from the following detailed description of a preferred embodiment of the invention when the same is read in conjunction with the accompanying drawings.

BRIEF DESCRIPTION OF THE DRAWINGS

FIG. 3 is a time chart for showing various time intervals to be set on rise-timing timers of respective nodes of the multiplex transmission system.

FIGS. 4A to 4C are schematic flow charts of control processes of respective nodes of the multiplex transmission system.

FIG. 5 is a table describing the content of various flags to be used in the control processes of FIGS. 4A to 4C.

DETAILED DESCRIPTION OF THE PREFERRED EMBODIMENT

Figure 1:
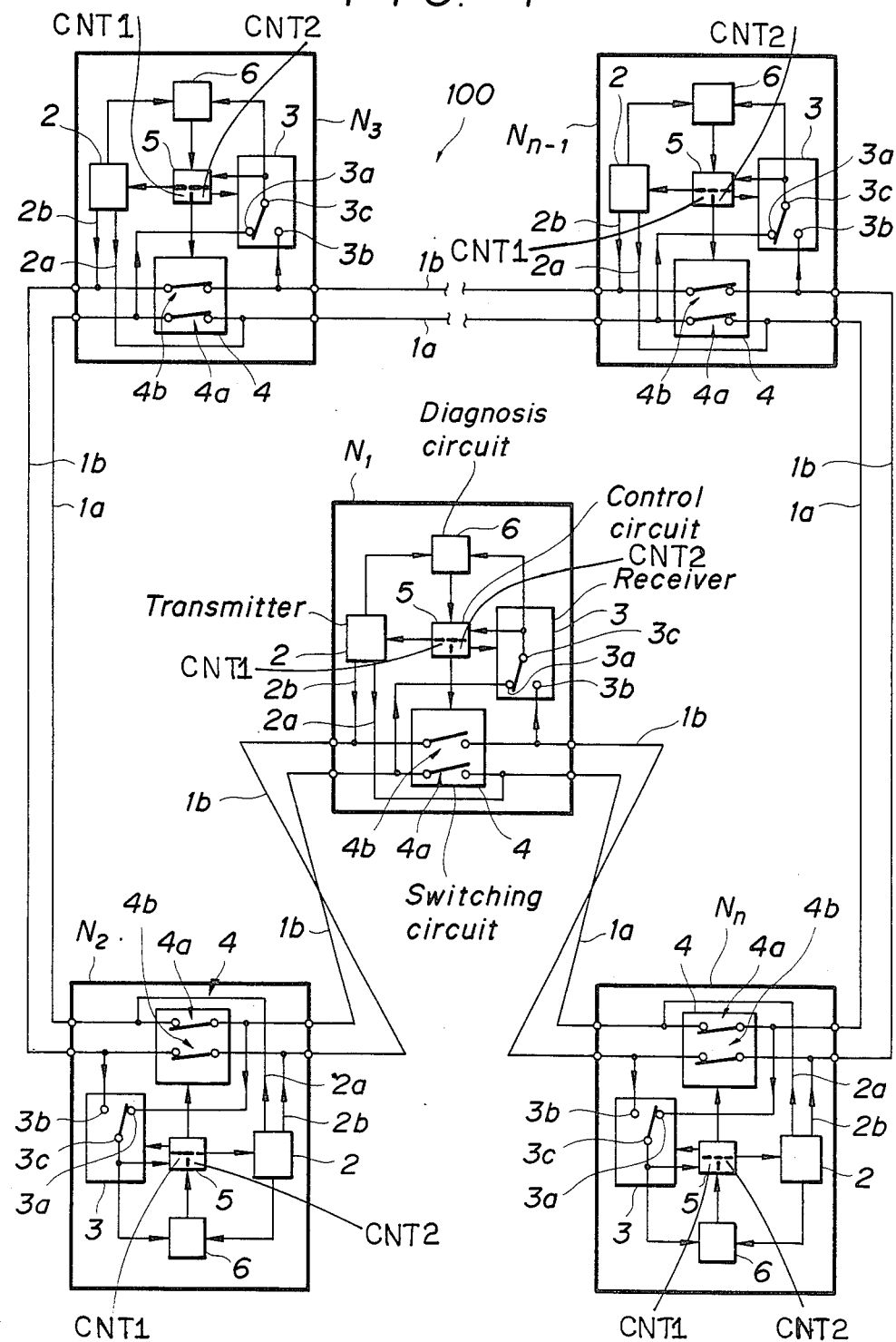
FIG. 1 is a block diagram of the entirety of a time-division multiplex transmission system according to a preferred embodiment of the present invention.

Referring first to FIG. 1, designated at reference numeral 100 is a time-division multiplex transmission system according to a preferred embodiment of the present invention. The multiplex transmission system 100 comprises first to n-th nodes $N_1$ to $N_n$ alike of circuit constitution, though being different in the content of control process, and a bidirectional or bilateral type transmission path consisting of a pair of signal transmission lines 1a, 1b with which the respective nodes $N_1$ to $N_n$ are connected in a looped manner. Incidentally, shown in FIG. 1 is a state of the system 100, in which the first node $N_1$ only is caused to function for transmitting a signal therefrom, leaving the other nodes $N_2$ to $N_n$ as they are devoted to functioning for receiving the signal.

The nodes $N_1$ to $N_n$ are each respectively adapted to function as a signal transmitting and receiving device, and have their sensors (not shown) as well as their drive circuits (not shown) for driving various loads (not shown) disposed in a vehicle.

Description of circuit constitution will now be made only of the first node $N_1$ that is adapted to initially serve as a temporary master node when the entire system 100 is powered on. In this connection it is advised that, as described, the respective nodes $N_1$ to $N_n$ have like circuitries.

The node $N_1$ comprises a transmitter 2 connected to the signal transmission lines 1a, 1b through a pair of signal output lines 2a, 2b adapted for outputting to supply to both of the transmission lines 1a, 1b a combination signal consisting of a signal including the address of the node $N_1$ and a signal of data therefrom, a receiver 3 connected to the transmission lines 1a, 1b and adapted to receive from the lines 1a, 1b any signal that is transmitted therethrough to the node $N_1$, a switching circuit 4 installed in, for breaking and making, as required, a part of the bilateral transmission path consisting of the transmission lines 1a, 1b, a diagnosis circuit 6 for checking to diagnose whether or not the content of a signal received by the node $N_1$ from either of the transmission lines 1a, 1b is equal to that of the combination signal as concurrently transmitted from the node $N_1$ itself to the lines 1a, 1b, and a control circuit 5 connected for control purpose to the transmitter 2, the receiver 3, the switching circuit 4, and the diagnosis circuit 6 as well as to those electrical equipments and appliances (not shown) which are put under control of the node $N_1$, the control circuit 5 being provided with various necessary devices such as an I/O (input/output) interface, a ROM (read only memory), a RAM (random access memory), and a CPU (central processing unit).

The transmitter 2 is adapted, any time when supplying information therefrom through the signal output lines 2a, 2b to the signal transmission lines 1a, 1b, to concurrently output therefrom either of a pair of signals of the same content to both of the transmission lines 1a, 1b. In this respect, however, the output lines 2a, 2b are separated from each other even in the transmitter 2.

The receiver 3 includes a pair of signal input terminals 3a, 3b connected to the signal transmission lines 1a, 1b, respectively, and a single reception terminal 3c adapted to be selectively connected to one of the input terminals 3a, 3b. The reception terminal 3c of the receiver 3 is connected, through unshown receiver elements, to the control circuit 5 and the diagnosis circuit 6 and adapted, when the system 100 is started, to be first connected to the input terminal 3a.

The switching circuit 4 comprises a pair of normal-closed type switches 4a, 4b installed in the signal transmission lines 1a, 1b, respectively, for breaking and making, as required, such respective parts thereof that are stretched across the node $N_1$ itself. More particularly, the switches 4a, 4b are opened while the node $N_1$ is caused to transmit a signal therefrom to the transmission lines 1a, 1b, and kept closed while the node $N_1$ is left as it is devoted to signal reception from the lines 1a, 1b.

The diagnosis circuit 6 is adapted to inform the control circuit 5 of abnormalities in the signal transmission line 1a or 1b and at any of the other nodes $N_2$ to $N_n$, by comparing the content of a signal received from the transmission lines 1a, 1b with that of a signal concurrently transmitted from the node $N_1$ to the lines 1a, 1b.

The control circuit 5 is adapted, while the node $N_1$ is put in a signal transmitting state thereof, to have the transmitter 2 transmit a signal, keeping the switches 4a, 4b of the switching circuit 4 as they are opened. It is advised in this connection that during such time interval, although the reception terminal 3c of the receiver 3 is connected to the control circuit 5, no direct signal is input from the terminal 3c to the circuit 5. Moreover, in a signal receiving and conducting state of the node $N_1$, in which a signal transmitted from any of the other nodes $N_2$ to $N_n$ is sent along the signal transmission lines 1a, 1b to the node $N_1$, to be received here, and needed to be further conducted along the transmission lines 1a, 1b across the node $N_1$, the control circuit 5 is adapted to have the receiver 3 receive the signal through the reception terminal 3c, permitting the signal to be processed in accordance with a prepared process control program, while leaving the switches 4a, 4b of the switching circuit 4 as they are closed.

The control and the diagnosis circuits 5, 6 are adapted to cooperate with each other to constitute a control process unit of the node $N_i$.

For the remaining nodes $N_2$ to $N_n$, which have like circuitries to the node $N_1$, description of circuit constitution is omitted.

In the multiplex transmission system 100, after lapse of a predetermined time from application of power thereto, the node $N_1$ is first caused to rise, that is, to start transmitting a signal. Thereafter, the remaining nodes $N_2$ to $N_n$ are caused to likewise rise in the order of $N_2$, $N_3$, $N_4$ (not shown), ..., $N_{n-1}$, and $N_n$. After completion of signal transmission of the last node $N_n$, the first node $N_1$ again comes to rise. Such cycle of signal transmission of the nodes $N_1$ to $N_n$ is continuously repeated also thereafter, while the system 100 remains alive with power applied.

In this respect, the multiplex transmission system 100 is adapted such that the node to come to the next of i-th node $N_i$ (where number or suffix "i", which fundamentally is used for collective representation of respective integers between and inclusive of 1 and n, may be taken for arbitrary one of them if so construed from associated context) is selected to be i+1-th node $N_{i+1}$, depending on address signal $A_i$ transmitted from the node $N_i$ to the signal transmission lines 1a, 1b, provided that, to the next of the n-th node $N_n$, the first node $N_1$ comes to perform signal transmission therefrom.

It will be comprehended that, while any $N_i$ of the nodes $N_1$ to $N_n$ is transmitting a signal therefrom, the remaining nodes $N_i$ to $N_{i-1}$ and $N_{i+1}$ to $N_n$ are each respectively held in a signal receiving and conducting state thereof, leaving respective switches 4a, 4b of switching circuit 4 thereof as they are closed.

Figure 2A:
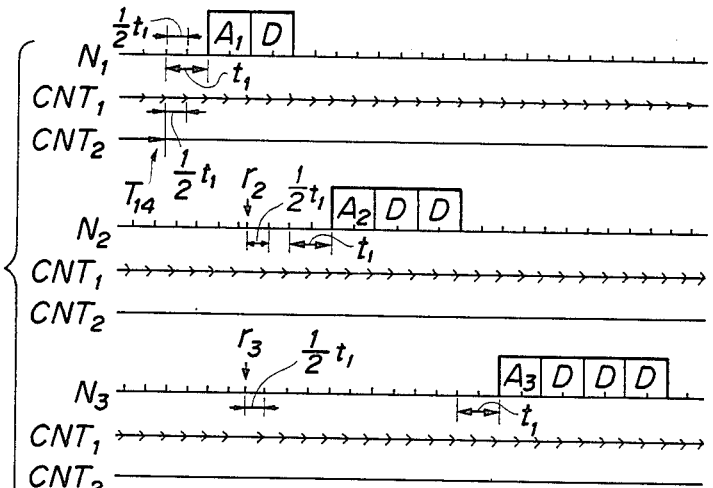
FIGS. 2A to 2C are time charts for showing the sequence of address signals and data signals to be transmitted from respective nodes to a signal transmission path of the multiplex transmission system.

FIG. 2A is a time chart of respective address signals $A_i$ and data signals D sequentially transmitted from various nodes $N_i$ to the signal transmission lines 1a, 1b of the multiplex transmission system 100, whereas, for elimination of complicatedness, there are exemplarily shown no more than signals $A_i$ and D from the first to third nodes $N_1$, $N_2$, $N_3$, for a time interval in which these nodes $N_1$, $N_2$, $N_3$ are caused to rise in turn for the first time after the transmission system 100 has been started with application of power.

Upon the application of power to the transmission system 100, each node $N_i$ thereof has its programmed initialization process executed and input terminal 3a of its receiver 3 is selected to be connected to reception terminal 3c of same. Thereafter, signal transmission and reception among the nodes $N_1$ to $N_n$ are to be performed in a later-described manner.

Incidentally, each node $N_i$ has built, in control circuit 5 thereof, a synchronizing time counter $CNT_1$ and a triggering and supervising time counter $CNT_2$.

There will be described below respective functions of the time counters $CNT_1$ and $CNT_2$.

The synchronizing counter $CNT_1$ of each node $N_i$ is adapted, when once reset, to repeat measuring a time-base interval $\frac{1}{2}t_1$ as a basic time interval for timing signal transmission. At the time when the counter $CNT_1$ has timed out or up, that is, when the set time $\frac{1}{2}t_1$ is just over, a corresponding flag $F_1$ (time-up flag, FIG. 5) is set to "1" irrespective of the state that the flag $F_1$ is then put in.

The triggering and supervising counter $CNT_2$ of each node $N_i$ is adapted to measure, as circumstances require, one of two rise-timing time intervals $t_{i3}$ and $t_{i4}$ (provided that the suffix "i" of each of the terms $t_{i3}$, $t_{i4}$ shall read "x" or "j" if so construed from the context) preset in consideration of some requisites for the node $N_i$ to which the counter $CNT_2$ in concern belongs or a preset monitoring time interval $t_2$ for timing the transmission of data signal D of the node $N_i$ that depends on address signal $A_x$ (where "x" is an arbitrary integer between and inclusive of 1 and n, while excluding i as a particular numeral) as just received by the node $N_i$ from any $N_x$ of the remaining nodes $N_1$ to $N_{i-1}$ and $N_{i+1}$ to $N_n$. Incidentally, to make accord with the naming of the latter interval $t_2$, the former intervals $t_{i3}$ and $t_{i4}$ may be called as monitoring time intervals for timing the transmission of address signal $A_i$ of the node $N_i$. At the time when the counter $CNT_2$ has timed up, a flag $F_2$ or $F_3$ or $F_4$ (time-up flag, FIG. 5) corresponding to the set time $t_2$ or $t_{i3}$ or $t_{i4}$ respectively is set to "1".

Incidentally, the function of the foregoing flags $F_1$, $F_2$, $F_3$, and $F_4$ will be described later in conjunction with FIG. 5.

Further, in the time chart of FIG. 2A, there are exemplarily shown various mutual relations of the timing for transmission of respective address signals $A_1$, $A_2$, $A_3$ and data signals D from the first, second, and third nodes $N_1$, $N_2$, and $N_3$ to the signal transmission lines 1a, 1b, as well as associated time-up points of respective synchronizing counters $CNT_1$ of the nodes $N_1$, $N_2$, $N_3$. Though, practically, in line with the count by these counters $CNT_1$ there being made also the count by respective triggering and supervising counters $CNT_2$ of the nodes $N_1$, $N_2$, $N_3$, FIG. 2 has omitted representation of the latter to avoid complicatedness, except for an initial time-up point $T_{14}$ of the counter $CNT_2$ at the first node $N_1$.

At the respective nodes $N_1$ to $N_n$, after input terminals $3a$ of their receivers 3 have been selected and connected to reception terminals $3c$ of same, the respective counters $CNT_1$ and $CNT_2$ are caused to start counting.

In this connection, upon completion of the initialization process, the counter $CNT_2$ of each node $N_i$ has first set thereon a time interval of a $10 \cdot t_{i4}$ length as a ten-fold initial-phase version of the preset rise-timing period $t_{i4}$.

Incidentally, though limited to the first to fourth nodes $N_1$ to $N_4$, the preset length of respective rise-timing intervals $t_{i4}$ is given in a graph of FIG. 3. In this graph, represented by capital letter X is a unit time length that corresponds to the longest one out of respective necessary time intervals for transmission of signals of the nodes $N_1$ to $N_n$, and has such a relationship to each rise-timing interval $t_{i4}$ that $t_{i4} = X \cdot i$.

As a result, the rise-timing interval $t_{i4}$ is preset to be shortest at the first node $N_1$ where $i=1$, and hence in the initial stage the counter $CNT_2$ of this node $N_1$ is to have timed up earlier than any of the counters $CNT_2$ of the other nodes $N_2$ to $N_n$. This time-up point is exemplarily marked at $T_{14}$ on time axis in the time chart of FIG. 2A.

Incidentally, at such time point, the node $N_1$ has already started the counter $CNT_1$ thereof, as shown in FIG. 2A. In the time chart of FIG. 2A, like the case of other Figures, arrow marks plotted on the time axes of the counters $CNT_1$ represent respective time points where the counters $CNT_1$ have timed up.

After lapse of a monitoring interval $t_1$ as a double of the time-base interval $\frac{1}{2}t_1$ from the time-up point $T_{14}$ of the counter $CNT_2$ of the first node $N_1$, this node $N_1$ is triggered to transmit therefrom address signal $A_1$ followed by data signal D to the signal transmission lines $1a$, $1b$, while having and holding the switches $4a$, $4b$ of the switching circuit 4 opened. The address signal $A_1$ of the first node $N_1$ is then received together with the data signal D thereof by the node $N_1$ itself, at the reception terminal $3c$ of its own receiver 3, and read into the diagnosis circuit 6. During such signal transmitting state of the node $N_1$, respective switches $4a$, $4b$ of switching circuits 4 of the remaining nodes $N_2$ to $N_n$ are all kept closed.

In this connection, it is now advised that the address signal $A_i$ of any node $N_i$ has the word length thereof fixed to be a single byte of which start bit as the MSB (most significant bit) is set to "1", while the number of bytes of the data signal D is irregular among the nodes $N_1$ to $N_n$ but proper to each node $N_i$. In this respect, practically, it may well so follow that $n \leq 128$. More particularly, for the first, second, and third nodes $N_1$, $N_2$, and $N_3$, the word length of the data signal D is predetermined to be one, two, and three bytes, respectively, in this embodiment; for the remaining nodes $N_4$ to $N_n$ also that of the data signal D may be predetermined adequate as a matter of course.

Moreover, it is advised that, in the transmission system 100, each of the address and the data signals $A_i$, D of any node $N_i$ is transmitted so as to have the first four bits thereof as well as the last four bits thereof sent to any node $N_j$ (where "j" is used in the same sense as i) within a period corresponding to the time-base interval $\frac{1}{2}t_1$ to be measured by the synchronizing counter $CNT_1$.

Further, at each node $N_x$, upon completion of reception of the address signal $A_i$ from any node $N_i$, the counter $CNT_1$ of its own is reset.

In the time chart of FIG. 2A, a time point where the respective synchronizing counters $CNT_1$ are reset with the address signal $A_1$ from the first node $N_1$ is marked on the time axes of the second and third nodes $N_2$ and $N_3$, at $r_2$ and $r_3$, respectively. It will be easily understood that, at the same time point, also the counters $CNT_1$ of the remaining nodes $N_4$ to $N_n$ are all reset. The respective nodes $N_2$ to $N_n$ and the node $N_1$ are thus synchronized of the timing for signal transmission.

With complete data signal D transmitted from the first node $N_1$, the respective nodes $N_2$ to $N_n$ at the reception side execute various associated signal processes, as required, that is, some of them are not obliged to respond to the data signal D from the node $N_1$. Necessary times for such processes are set extremely short, when compared with the time-base base interval $\frac{1}{2}t_1$.

On the other hand, with the address signal $A_1$ received from the first node $N_1$, each of the nodes $N_2$ to $N_n$ is caused to increment an address pointer thereof, thereby judging whether or not its own signal transmission should be made next, as will be described later.

Here, only the second node $N_2$ judges, according to its address pointer, that its own signal transmission should be made next. Each of the remaining nodes $N_3$ to $N_n$, judging that the order of its own signal transmission will not come next, enters a waiting state thereof, where it waits signal transmission from the second node $N_2$.

Moreover, the node $N_2$, after the judgment that the order of its own signal transmission should come next, again increments the address pointer just before the signal transmission of its own. It should be noted that, also in the case of any other node $N_i$, such additional increment is to be necessarily given under similar conditions.

At the first node $N_1$, after the transmission of the combination signal of the address and the data signals $A_1$, D, there is made by the diagnosis circuit 6 a judgment whether or not the same signal as the combination signal that the node $N_1$ has just transmitted (to both of the signal transmission lines $1a$, $1b$) is received (from selected one of the lines $1a$, $1b$, that is, from the line $1a$ in this case) by the node $N_1$ itself, while the switches $4a$, $4b$ of the switching circuit 4 are both closed. If the same signal is not received, whereby detection is made of an abnormality of one $1a$ of the signal transmission lines $1a$, $1b$ such as disconnection thereof or unexpected disturbance thereto or an abnormality of any other node $N_i$, information thereon is notified to the control circuit 5, which in turn gives, at a time point where the time-base interval $\frac{1}{2}t_1$ has just elapsed after completion of the transmission of signals $A_1$, D from the node $N_1$, a command to have the input terminal $3b$ (in place of the other input terminal $3a$) selected to be connected to the reception terminal $3c$ of the receiver 3. Then, at the time of the node $N_1$'s own signal transmission in the next cycle, the node $N_1$ has added, at the rear of data signal D therefrom, abnormality information data informing that the signal transmission of the node $N_1$ in the last cycle was ineffective. Since the word length of data signal D from any node $N_i$ is proper to the node $N_i$, as described, each of the nodes $N_2$ to $N_n$ is permitted to recognize the abnormality information data added to the data signal D of the node $N_1$. Thereafter, with rise-timing interval $t_{i4}$ set on the counter $CNT_2$, the node $N_1$ enters a waiting state thereof, where it waits signal transmission from any of the remaining nodes $N_2$ to $N_n$.

It is now advised that such diagnosis for abnormalities and addition of abnormality information data are likewise performed at each of the remaining nodes $N_2$ to $N_n$ as well, though description thereof is omitted.

After lapse of the monitoring interval $t_1$ as double of the time-base interval $\frac{1}{2}t_1$ from the completion of signal transmission of the first node $N_1$, the second node $N_2$ has switches 4a, 4b of switching circuit 4 thereof opened and starts signal transmission thereof, that is, transmission of a combination signal consisting of an address signal $A_2$ and a data signal D of a 2-byte length.

Upon completion of signal transmission from the second node $N_2$, the other nodes $N_1$ and $N_3$ to $N_n$ execute their associated signal processes, as required.

At each of the nodes $N_1$ and $N_3$ to $N_n$, in accordance with its reception of the address signal $A_2$, its address pointer is incremented, to thereby judge whether or not the order of its own signal transmission should come next. Here, based on the address pointer, only the third node $N_3$ is to judge that its own signal transmission should be made next. Each of the remaining nodes $N_1$ and $N_4$ to $N_n$, judging that the order of its own signal transmission will not come next, enters a waiting state thereof, where it waits signal transmission from the third node $N_3$.

At the second node $N_2$, after transmission of the address and the data signals $A_2$, D, the switches 4a, 4b of the switching circuit 4 are both closed. Then, with rise-timing interval $t_{24}$ set on the counter $CNT_2$, the node $N_2$ enters a waiting state thereof, where it waits signal transmission from any of the remaining nodes $N_1$ and $N_3$ to $N_n$.

After lapse of the monitoring interval $t_1$ from the completion of signal transmission of the second node $N_2$, the third node $N_3$ has switches 4a, 4b of switching circuit 4 thereof opened and starts signal transmission thereof, that is, transmission of a combination signal consisting of an address signal $A_3$ and a data signal D of a 3-byte length.

Hereafter, the fourth to n-th nodes $N_4$ to $N_n$ are to likewise make signal transmission thereof one after another in the ascending order of suffix number, thereby completing one cycle of signal transmission in the system 100. Then, to the place of the first node $N_1$, there again comes around the order of signal transmission. Like this, in the system 100, such cycle of signal transmission is ceaselessly repeated. In this respect, it will be understood that, when the n-th node $N_n$ has transmitted therefrom a combination signal consisting of an address signal $A_n$ and a data signal D, the first node $N_1$ makes upon reception thereof a judgment that the order of signal transmission of its own should come next.

In the signal transmission cycle described, the triggering and supervising counter $CNT_2$ of any node $N_i$ has updated the rise-timing interval $t_{i4}$ set thereon as address-signal-transmission-timing monitoring interval (hereinafter called from place to place as "address" monitoring period, some examples thereof being shown in FIG. 3 as aforementioned), when the node $N_i$ has normally received address signal $A_x$ and data signal D from any other node $N_x$ or when the node $N_i$ has normally transmitted therefrom address signal $A_i$ and data signal D.

In a case where certain node $N_i$ happens to malfunction, therefore, that one of the remaining nodes $N_x$ which has the shortest test "address" monitoring interval is the first rise.

Exemplarily, in such a case that the n-th node $N_n$ is failing to rise for certain reason, the counter $CNT_2$ of the first node $N_1$ times up when the "address" monitoring interval $t_{14}$ has elapsed after reception of address signal $A_{n-1}$ and data signal D from the n-1-th node $N_{n-1}$, and the node $N_1$ starts transmitting signals $A_1$, D thereof when the monitoring interval $t_1$ has further elapsed from the time-up point of the counter $CNT_2$. Incidentally, in FIG. 3, such start points of signal transmission of some nodes ($N_1$ to $N_4$) are exemplarily marked by associated time-representative arrows, at $R_1$ for the first node $N_1$.

Likewise, even in the case where the first node $N_1$ is failing to rise for certain reason, the counter $CNT_2$ of the second node $N_2$ times up when the "address" monitoring interval $t_{24}$ has elapsed after reception of address signal $A_n$ and data signal D from the n-th node $N_n$, and the node $N_2$ starts transmitting signals $A_2$, D thereof when the monitoring interval $t_1$ has further elapsed from the time-up point of the counter $CNT_2$. For the second node $N_2$, the start point of signal transmission is marked at $R_2$ in FIG. 3.

As will be understood, in cases where an arbitrary one $N_i$ of the nodes in the system 100 (but the first one $N_1$) happens to malfunction, it is the first node $N_1$ that comes first to rise. Moreover, it is in those cases where at least the first and second nodes $N_1$, $N_2$ are both caused to malfunction that the third node $N_3$ comes first to rise at a start point $R_3$ thereof in FIG. 3. Likewise, in those cases where at least the first to third nodes $N_1$ to $N_3$ are all caused to malfunction, the fourth node $N_4$ comes first to rise at a start point thereof $R_4$ in the same Figure.

In this connection, in the multiplex transmission system 100, each node $N_i$ is adapted, upon reception of address signal $A_x$ from any other node $N_x$, to have an address table of its own corrected, as necessary.

More particularly, in the system 100, in which in dependence on address signal $A_i$ received from i-th node $N_i$, the node next to come to transmit signals thereof is selected to be i+1-th node $N_{i+1}$, in order to ensure such selection each of the nodes $N_1$ to $N_n$ has built in the memory thereof an exclusive-use address table adapted such that, in the initialization process upon the application of power, such sets of data as correspond to respective address signals $A_l$ to $A_n$ are continuously written in order of suffix numeral "i" of associated reference character $A_i$ (hereinafter, also these sets of address data as well as their addresses are represented by corresponding characters $A_i$) and an address pointer is set so as to point at a first address $A_l$ in the address table.

In this respect, normally, with the address pointer pointing at one $A_i$ of the first to n-th addresses $A_l$ to $A_n$, in the address table, the order of signal transmission of each node $N_i$ is determined.

At each node $N_i$, normally, when it has received address signal $A_j$ from any node $N_j$, the address pointer which has been pointing at a corresponding address $A_j$ till then is incremented to point at an address $A_{j+1}$ corresponding to the next node $N_{j+1}$ of the node $N_j$, that is, to the node next to come to perform signal transmission thereof. In the case where thus-pointed-at address $A_{j+1}$ falls in the same place as an address $A_i$ corresponding to the node $N_i$, this node $N_i$ judges that the order of its own signal transmission should come next.

The aforementioned correction of address table at each node N is executed in such a manner as will be described below with respect to a particular case.

As a comprehensible example, there is now supposed a case where, even after completion of signal transmission from the second node $N_2$, the third node $N_3$ will not rise.

Upon the completion of signal transmission from the second node $N_2$, at each of the respective nodes $N_1$, $N_2$, and $N_4$ to $N_n$ excepting the third node $N_3$ the address pointer is incremented so as to point at a third address $A_3$ in the address table.

In the present case, however, as aforementioned in conjunction with FIG. 3, as the next node there comes the first node $N_1$ to rise at a time point where the sum of the "address" monitoring interval $t_{14}$ and the monitoring interval $t_1$ has elapsed from the completion of signal transmission of the second node $N_2$, thus first transmitting therefrom the address signal $A_1$. At each of the remaining nodes $N_2$ and $N_4$ to $N_n$, based on the address signal $A_1$ then received it is judged that the address to be recognized from the content of address data now given is the first address $A_1$ that is different from the third address $A_3$ currently pointed at by the address pointer and besides antecedent in order to the third address $A_3$. Then, on the basis of this judgment, the third address $A_3$ in the address table is deleted, thereby shortening this table by one byte, and the address pointer is moved so as to point at the first address $A_1$ corresponding to the first node $N_1$ that has just transmitted the address signal $A_1$.

In the first node $N_1$, at a time point where the counter $CNT_2$ on which the "address" monitoring interval $t_{14}$ and a later-described "address" monitoring interval $t_{13}$ are set times up, the third address $A_3$ that has been pointed at till then by the address pointer in the address table is deleted from the address table, thereby shortening this table by one byte, and the address pointer is moved so as to point at the first address $A_1$ corresponding to the first node $N_1$ itself.

In the case in concern where the third node $N_3$ is failing to rise, therefore, as a result of such correction of the address table, the remaining nodes $N_1$, $N_2$, and $N_4$ to $N_n$ are adapted to cooperate with one another to perform their signal transmission in the ascending order of suffix numerals in a cyclic manner.

In this connection, in cases where a certain node $N_j$ of whose order of signal transmission has come next after any other node $N_x$ and has an inherent address $A_j$ thereof larger of address number than that address $A_i$ ($i<j$) which is then pointed at by the address pointer, the node $N_j$ which might well have been malfunctioning for some reason can be put in order by properly writing the address $A_j$ in the address table.

Figure 2B:
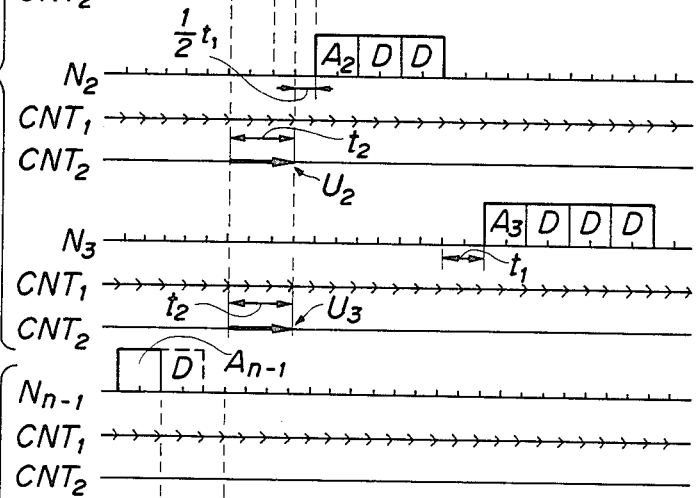

FIG. 2B is a time chart for describing, in cases where, among the respective nodes $N_1$ to $N_n$ having been synchronized in the multiplex transmission system 100 as once normally started, arbitrary one $N_i$ happens to be kept from outputting data signal D thereof, how the remaining ones $N_x$ transmit address and data signals $A_x$, D thereof to the signal transmission lines 1a, 1b, whereas to avoid complicatedness there are shown in the Figure no more than those signals to be transmitted from the first node $N_1$ as $N_i$ and the second and the third nodes $N_2$, $N_3$ as $N_x$, whether real or imaginary.

In other words, there is supposed such a condition that only the data signal D of the first node $N_1$ is kept from being transmitted.

Incidentally, upon reception of address signal $A_i$ from arbitrary node $N_i$, each node $N_x$ has set on the counter $CNT_2$ thereof a data signal monitoring time interval $t_2$ of a time length to be determined depending on the received address signal $A_i$, such that:

$$t_2 = \tfrac{1}{2} t_1 (2 \cdot L_i + 1),$$

where $L_i$ is the word length in terms of a byte of that data signal D which inherently is expected to be transmitted from the node $N_i$ that has just transmitted therefrom the address signal $A_i$, (provided that the suffix "i" of the term $L_i$ shall read "x" or "j" if so construed).

In the present case, the first node $N_1$ of which data signal D is predetermined to be one byte in word length corresponds to the node $N_i$ and hence $L_i = 1$, so that:

$$t_2 = \tfrac{1}{2} t_1 (2 \cdot 1 + 1) = (3/2) t_1.$$

At each node $N_x$ with the supervising period $t_2$ of such length set on the counter $CNT_2$, the counter $CNT_2$ starts counting down the monitoring interval $t_2$ upon completion of transmission of the address signal $A_i$ ($A_1$ in this case) and times up when the interval $t_2$ has elapsed.

Such time-up point of the counter $CNT_2$ is marked on associated time axis of each node $N_x$ in FIG. 2B, at $U_2$ for the second node $N_2$ and $U_3$ for the third node $N_3$. It will be understood that, in any other node $N_x$, the counter $CNT_2$ times up at the same time point.

Moreover, at each node $N_x$, that is, at any of the second to the n-th nodes $N_2$ to $N_n$ in this case, just after having timed up, the counter $CNT_2$ has set thereon the address-signal-transmission-timing monitoring time interval $t_{i3}$ (hereinafter called as "address" monitoring interval), of which time length is determined such that:

$$t_{i3} = t_{i4} - \tfrac{1}{2} t_1,$$

where suffix i shall read x as a matter of course.

Then, at each node $N_x$, the address pointer is incremented, thereby judging whether or not the order of its own signal transmission should come next.

Here, only the second node $N_2$ judges that the signal transmission of the node $N_2$ itself should be performed next. Each of the remaining nodes $N_3$ to $N_n$, judging that the order of its own signal transmission will not come next, enters a waiting state thereof, where it waits signal transmission from the second node $N_2$.

Further, at the second node $N_2$, the address pointer is again incremented, just before the signal transmission of the node $N_2$ itself.

Then, at a time point where the time-base interval $t_1$ has elapsed from the time-up point marked at $U_2$ or $U_3$, the second node $N_2$ opens switches 4a, 4b of switching circuits 4 thereof and starts signal transmission.

Thereafter, the remaining nodes $N_3$ to $N_n$ likewise perform signal transmission thereof one after another in the ascending order of suffix numeral, thereby constituting a cycle together with the first and the second nodes $N_1$, $N_2$. In the system 100, such cycle is ceaselessly repeated, whereas at the first node $N_1$ the address signal $A_1$ only is to be transmitted while the node $N_1$ is left as it is kept from outputting data signal D thereof.

Figure 2C:
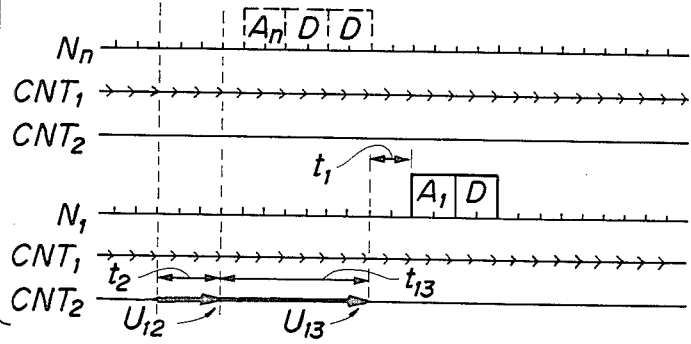

FIG. 2C is a time chart for describing, in cases where, among the respective nodes $N_1$ to $N_n$ having been synchronized in the multiplex transmission system 100 as once normally started, arbitrary one $N_i$ happens to be kept from outputting data signal D thereof and besides that one $N_{i+1}$ of which order of signal transmission inherently should come next of the arbitrary node $N_i$ fails to transmit address and data signals $A_{i+1}$, D thereof, how the remaining ones $N_x$ (where suffix x is not equal to i nor i+1) transmit address and data signals $A_x$, D thereof to the signal transmission lines 1a, 1b, whereas to avoid complicatedness there are shown in the Figure no more than those signals to be transmitted from the n-1-th node $N_{n-1}$ as $N_i$, the n-th node $N_n$ as $N_{i+1}$, and the first node $N_1$ as $N_x$, whether real or imaginary.

In other words, there is supposed such a condition that only the data signal D of the n-1-th node $N_{n-1}$ and the address and the data signals $A_n$, D of the n-th node $N_n$ are kept from being transmitted.

In this connection, it is further supposed that, among respective combination signals to be transmitted from the nodes $N_1$ to $N_n$, that one which is longest in word length consists of an address signal 1-byte long and a data signal 3-byte long, thus having a 4-byte length in total. As a result, the unit length X in FIG. 3 becomes equal to $4t^1$, that is, $X=4t_1$. It thus so follows that: $t_{14}=X\cdot 1=4t_1$; and $t_{13}=t_{14}-\frac{1}{2}t_1=3.5t_1$.

In the present case, upon reception of the address signal $A_{n-1}$ from the n-1-th node $N_{n-1}$, each normal node $N_x$ (x=1 to n-2 in this case) has set on the counter $CNT_2$ thereof a data signal monitoring interval $t_2$ with a time length determined from the received address signal $A_{n-1}$. When supposing that the word length of that data signal D which inherently is expected to be transmitted from the n-1-th node $N_{n-1}$ is one byte, that is, $L_i=1$, the monitoring interval $t_2$ is to be given such that:

$$t_2=\tfrac{1}{2}t_1(2\cdot 1+1)=(3/2)t_1.$$

At each node $N_x$ with the monitoring interval $t_2$ of such time length set on the counter $CNT_2$, the counter $CNT_2$ starts measuring the interval $t_2$ upon completion of transmission of the address signal $A_{n-1}$ and times up when the interval $t_2$ has elapsed.

For the first node $N_1$, such time-up point of the counter $CNT_2$ is marked at $U_{12}$ on associated time axis in FIG. 2C. It will be understood that, in any other node $N_x$, the counter $CNT_2$ times up at the same time point.

Moreover, at each node $N_x$, just after having counted out the data signal supervising period $t_2$, the counter $CNT_2$ has set thereon the "address" monitoring interval $t_{i3}$, where suffix i shall read x as a matter of course.

Then, at each node $N_x$, the address pointer is incremented, thereby judging whether or not the order of its own signal transmission should come next.

Here, however, the node next to come to perform its own signal transmission inherently is n-th one $N_n$. Any other node $N_k$, thus judging that the order of its own signal transmission will not come next, enters a waiting state thereof, where it waits signal transmission from the n-th node $N_n$.

In the case in concern, however, the n-th node $N_n$ will not perform signal transmission. As a result, when the "address" monitoring interval $t_{13}$ has elapsed from the time-up point $U_{12}$ of the counter $CNT_2$ at the first node $N_1$, this counter $CNT_2$ again times up, which time-up point is marked at $U_{13}$ in FIG. 2C.

After lapse of the monitoring interval $t_1$ from the time-up point $U_{13}$ above, at the first node $N_1$, the address pointer is set so as to point at the address $A_1$ of the node $N_1$ itself. Then, with the switches 4a, 4b of the switching circuit 4 opened, the node $N_1$ starts signal transmission thereof, whereas the address pointer of the node $N_1$ is again incremented just before the signal transmission.

Thereafter, the remaining nodes $N_2$ to $N_{n-2}$ likewise perform signal transmission thereof one after another in the ascending order of suffix numeral, thereby constituting a cycle together with the first node $N_1$ and, in some cases, with the n-1-th node $N_{n-1}$ and/or the n-th node $N_n$. In the system 100, such cycle is ceaselessly repeated, whereas, between the signal transmission of the n-2-th node $N_{n-2}$ and that of the first node $N_1$, only the address signal $A_{n-1}$ of the n-1-th node $N_{n-1}$ is to be transmitted if this node $N_{n-1}$ is still kept from outputting data signal thereof and the nth node $N_n$ remains malfunctioning.

Referring now to FIGS. 4A to 4C and 5, description will be collectively made of flows of control programmed, in respective control circuits 5 of the nodes $N_1$ to $N_n$, to achieve such functions of the multiplex transmission system 100 as described. Respective programs in the control circuits 5 are all of such a structure as represented by a control flow shown in FIG. 4A, whereas the "address" monitoring interval $t_{i3}$ to be set at a later-described stage 71 of the flow and the "address" monitoring interval $t_{i4}$ to be set at later-described stages 54, 62, 84, and 88 of same have values thereof predetermined to be each respectively proper to corresponding one of the nodes $N_1$ to $N_n$.

It should be noted that, for easy understanding, the flow is now described for a single particular one $N_i$ of the nodes $N_1$ to $N_n$ and shall be so regarded unless otherwise construed from the context.

With power applied, the flow starts at a stage 50, and various initialization processes are executed at a stage 51.

Next, at a stage 52, the input terminal 3a of the receiver 3 is selected for signal reception. Then, at a stage 53, the counter $CNT_1$ is reset. Further, at a stage 54, the counter $CNT_2$ has set thereon a time $k\cdot t_{i4}$ of the "address" monitoring interval $t_{i4}$ times k, where k is an integer desired to be 10 or more, and a start flag (not shown) is reset "0", which flag is used, when in a later-described stage 66 the time-up flag $F_4$ is judged to have timed up, for judging whether or not the time-up is of the first time.

In this respect, when the counter $CNT_2$ has set thereon the monitoring interval $t_2$, $t_{i3}$, or $t_{i4}$, only that one of a triple of appointing flags $f_2$, $f_3$, $f_4$ which corresponds to the content of such setting is set to "1", with the rest reset to "0", and each of the time-up flags $F_2$, $F_3$, $F_4$ that is to be set to "1" when corresponding one of the intervals $t_2$, $t_{i3}$, $t_{i4}$ as set has timed up therewith is reset to "0". In FIG. 5 are shown interrelations and functions of those flags $F_2$, $F_3$, $F_4$ and $f_2$, $f_3$, $f_4$. Incidentally, in the case where at the stage 54 the counter $CNT_2$ has set thereon a time of $10t_{i4}$, the appointing flag $f_4$ is set to "1".

With respect to the counters $CNT_1$ and $CNT_2$, supplementary description will follow.

The counter $CNT_1$ is adapted, when once reset, to send one pulse to an interrupt terminal (not shown) of the CPU of the control circuit 5 every time when the interval $\tfrac{1}{2}t_1$ has elapsed, and the counter $CNT_2$ is adapted to send one pulse to another interrupt terminal (not shown) of the CPU when the time interval $t_2$, $t_{i3}$, or $t_{i4}$ as set on the counter $CNT_2$ has elapsed, whereas, between the above two interrupt terminals, that one which receives the pulse from the counter $CNT_1$ has priority of interruption to the other.

Figure 4A:
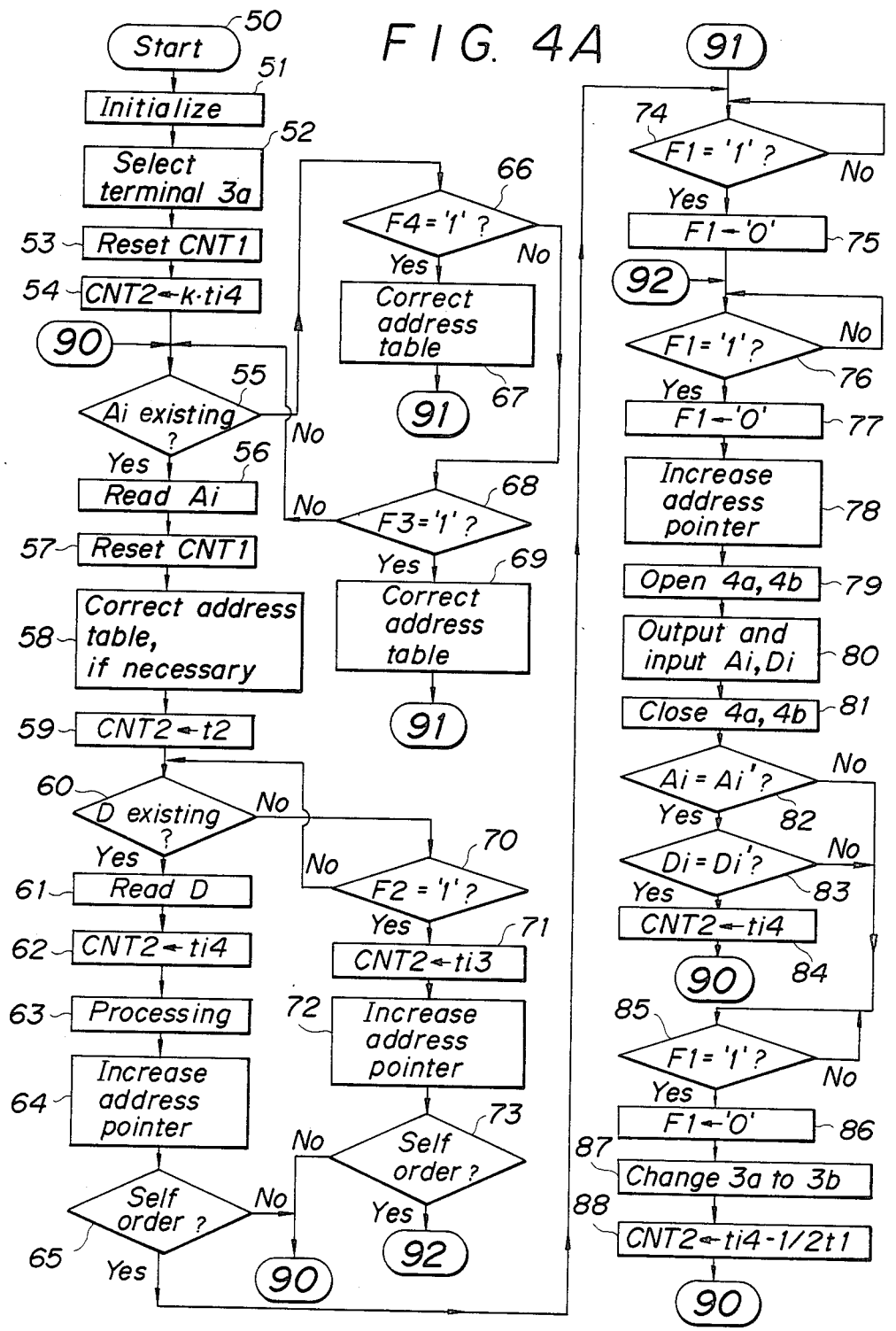

A pair of sub-routines for handling such interruption are shown in FIGS. 4A and 4B, respectively.

The sub-routine shown in FIG. 4B is adapted to handle the interruption from the counter $CNT_1$.

In this interrupt handler, at a stage 95b, additional interrupts are first disabled. Then, at a stage 95c, the time-up flag $F_1$ for measuring the time-base interval $\frac{1}{2}t_1$ is set to "1", irrespective of the state that the flag $F_1$ then has. Thereafter, at a stage 95d, interrupts are enabled, then the flow returns from a stage 95e to the main control routine.

The sub-routine of FIG. 4C is adapted to handle the interruption from the counter $CNT_2$.

In this interrupt handler also, at a stage 96b, additional interrupt is first disabled. Then, at a stage 96c, that one $F_i$ (where suffix i=2, 3, or 4) of the time-up flags which corresponds to that appointing flag $f_i$ (where suffix i=2, 3, or 4) which is then set to "1" is set to "1". Thereafter, at a stage 96d, interrupts are enabled, then the flow returns from a stage 96e to the main routine.

Returning now to FIG. 4A, continued description will be made of the control flow.

After necessary processes at the stage 54, while going round a triple of decision stages 55, 66, and 68, the flow as well as the node $N_i$ enters an idling state thereof, where it waits an address signal $A_j$ from any node $N_j$.

If received during the idling state, address signal $A_j$ from any node $N_j$ is read at a stage 56.

On the other hand, during the idling state, if the address monitoring flag $F_4$ as set to "1" is detected at the stage 66, the flow goes to a stage 67, where it first judges whether or not the start flag is set to "0".

If the start flag is judged to be "0", the flow goes, after having the start flag set to "1", simply to a later-described stage 74. In the case where the start flag is judged to be "1", the address table is corrected and the address pointer is set so as to point at the address $A_i$ of the node $N_i$ itself; thereafter the flow goes to the stage 74.

Likewise, during the idling state while the flow is going round the stages 55, 56, 68, if the address monitoring flag $F_3$ as set to "1" is detected at the stage 68, the flow goes to a stage 69, where the address table is corrected and the address pointer is set so as to point at the address $A_i$ of the node $N_i$ itself. Thereafter, the flow goes to the stage 74.

As described, when judged existing at the stage 55, any address signal $A_j$ is read at the stage 56; then, the counter $CNT_1$ is reset at a stage 57.

Next, at a stage 58, it is judged whether or not the address signal $A_j$ just read is correspondent to that address which is pointed at by the address pointer. If the signal $A_j$ is correspondent, the flow goes to a stage 59, without any correction of the address table. However, if it is not correspondent, the address table is shortened to be corrected by one byte and the address pointer is set so as to point at that address $A_j$ which is correspondent to the address signal $A_j$ just read; thereafter the flow goes to a stage 59.

At the stage 59, the counter $CNT_2$ has set thereon the "data" monitoring interval $t_2$ of a length that depends on the address signal $A_j$ read at the stage 56.

Subsequently thereto, while going round a pair of decision stages 60, 70, the flow as well as the node $N_i$ enters an idling state thereof, where it waits a data signal D to be transmitted from that node $N_j$ which has transmitted the address signal $A_j$ read above.

If received during this idling state, data signal D is read at a stage 61.

On the other hand, during this idling state, if the data monitoring flag $F_2$ as set to "1" is detected at the stage 70, the flow goes to a stage 71, where the counter $CNT_2$ has set thereon the "address" monitoring interval $t_{i3}$ to be used against abnormalities.

Then, at a stage 72, the address pointer is incremented and, at a stage 73, there is made a judgment whether or not the order of signal transmission of the flow or the node $N_i$ itself is next.

In the case where the order of its own signal transmission is judged to come next, the flow goes to a later-described stage 76.

To the contrary, if its own order is judged not to come next, the flow goes to the decision stage 55 to enter the idling state, where it now waits a data signal $A_{J+1}$ from that node $N_{j+1}$ which is at the order next to come to perform signal transmission.

As described, when judged existing at the stage 60, data signal D is read at the stage 61; then, at a stage 62, the counter $CNT_2$ has set thereon the "address" monitoring interval $t_{i4}$ to be used under normal conditions, which interval $t_{i4}$ is of such a length that depends on the number i of the node $N_i$ itself.

Moreover, at a stage 63, necessary signal processes are executed in accordance with the content the signals $A_j$ and D which were read at the stages 56 and 61, respectively. Also in the case where the data signal D is followed by the abnormality information signal which informs that the content of a transmitted signal in the last cycle is ineffective, necessary signal processes are executed at the same stage 63. At this stage 63, there is further executed a process for inputting data from those sensors which are put under control of the node $N_i$ itself.

Upon completion of processes at the stage 63, the flow goes to a stage 64, where the address pointer is incremented to thereby again judge, at a stage 65, whether or not the order of signal transmission of the flow or the node $N_i$ itself should come next.

In the case where, at the stage 65, the order of its own signal transmission is judged to come next, the flow goes to the stage 74.

To the contrary, if its own order is judged not to come next, the flow goes to the decision stage 55 to enter the idling state, where it now waits an address signal $A_{J+1}$ from that node $N_{j+1}$ which is at the order next to come to perform signal transmission.

Incidentally, at the stages 56 and 61, the address signal $A_j$ or the data signal D is read by 4 bits at intervals of the time base $\frac{1}{2}t_1$. Further, the necessary time interval for processes at the stage 63 is extremely shorter than the time-base interval $\frac{1}{2}t_1$.

At the stage 74, while idling, the flow is kept waiting till the time-base measuring flag $F_1$ is set to "1".

When the flag $F_1$ has become "1", the flow goes to a stage 76, where it resets the flag $F_1$ to "0".

Thereafter, at stages 76 and 77, the time-base interval $\frac{1}{2}t_1$ is consumed.

Then, at a stage 78, the address pointer is incremented.

As will be understood, it is only when the order of signal transmission of the flow or the node $N_i$ itself has come that the flow comes to and passes the stage 78.

After having passed as an approach toward such transmission a stage 79 where the switches 4a, 4b of the switching circuit 4 are opened, the flow comes to a stage 80 where its own address signal $A_i$ and data signal D of a necessary number of bytes are transmitted from the transmitter 2 and concurrently read into the diagnosis circuit 6, where they are stored in the form r f $A_i'$ and D'. In such signal transmission, if the content of the abnormality information signal informing that the content of a transmitted signal in the last cycle is ineffective is stored in the memory, this signal is attached from behind to the normal data signal D and transmitted together therewith.

Upon completion of the signal transmission at the stage 80, the flow goes to a stage 81 where the switches 4a, 4b of the switching circuit 4 are closed.

Then, at stages 82 and 83, a judgment is made of the transmitted signals $A_i$ and D as to whether or not they are equal to the stored signals $A_i'$ and D', respectively.

In the case where they are judged both equal, the flow goes to a stage 84, where the counter $CNT_2$ has set thereon the "address" monitoring interval $t_{i4}$ for normal use; thereafter it goes the stage 55, where it waits an address signal $A_{i+1}$ to be transmitted from that node $N_{i+1}$ of which order of signal transmission comes next.

If either of the transmitted signals $A_i$, D is judged unequal to the stored signals $A_i'$, D', the flow goes to a stage 85, where it is kept waiting while idling till the time-base measuring flag $F_1$ becomes "1".

When the flag $F_{il}$ has become "1", the flow goes to a stage 86, where it resets the flag $F_1$ to "0".

Then, at a stage 87, the input terminal 3b is selected (in place of the terminal 3a) to be connected to the reception terminal 3c of the receiver 3. Then, at a stage 88, the counter $CNT_2$ has set thereon a time interval of $t_{i4}\frac{1}{2}t_1$, and the memory has stored therein the content of the abnormality information signal to be transmitted in the next cycle to inform that the content of transmitted signal in the present cycle is ineffective.

Thereafter, the flow goes to the stage 55, where it again waits an address signal $A_j$ from any node $N_j$.

Incidentally, in the multiplex transmission system 100, each $N_i$ of the nodes $N_1$ to $N_n$ among which the order of signal transmission is determined in advance is adapted to conclude, depending on the address signal $A_j$ from any node $A_j$, that node $N_{j+1}$ which should come next to perform signal transmission. Therefore, the density of signal on the signal transmission lines 1a, 1b of the multiplex transmission system 100 is higher than that of the signal transmission line 211 in the aforementioned multiplex transmission system 200 which employs such a centralized control system that a certain node is selected as a master node and adapted to transmit a polling demanding signal to other nodes.

Moreover, in the multiplex transmission system 100, which may well be said to be a distributed control system in a sense, when address signal $A_j$ is normally received from certain node $N_j$, the counter $CNT_1$ adapted for measuring the time base $\frac{1}{2}t_1$ is reset at each of the remaining nodes $N_x$. Thus, after such reset action, the time base is synchronized among respective nodes $N_1$ to $N_n$, whereby useless waiting intervals can be eliminated, raising the signal density of the signal transmission lines 1a, 1b all the better.

In this respect, more particularly, the counter $CNT_1$ is adapted to be reset every time when having received address signal $A_x$ from any other node $N_x$ than its own, so that the synchronization of time base $\frac{1}{2}t_1$ can be firmly kept among the respective nodes $N_1$ to $N_n$.

Moreover, at the counter $CNT_2$ any node $N_i$, there is updated to be set thereon: each time when address signal $N_x$ and data signal D are normally received from any other node $N_x$ than the node $N_i$, the "address" monitoring interval $t_{i4}$ of a length peculiar to the node $N_i$; in an abnormal state in which certain node $N_x$ is transmitting address signal $A_x$ only, the "address" monitoring interval $t_{i3}$ as additional time interval; and at a time point where address signal $A_x$ is received from any other node $N_x$, the "data" monitoring interval $t_2$.

When the "address" monitoring interval $t_{i3}$ or $t_{i4}$ as thus set at any node $N_i$ is timed up, the node $N_i$ rises to start transmitting address signal $A_i$ and data signal D. In the case where the "data" monitoring interval $t_2$ is timed up, the node $N_i$ enters a waiting or signal transmitting state thereof.

Accordingly, even when, with an abnormality arising at a ny node $N_i$, the node $N_i$ is caused to fail to transmit both or either of address signal $A_i$ and data signal D thereof, a certain other node $N_k$ is permitted to rise with lapse of the monitoring time interval $t_{i4}$, $t_{i3}$, or $t_2$, thus successfully avoiding malfunction of the entire system 100.

Incidentally, such advantages result from the counter $CNT_2$ functioning as a monitoring timer.

It will be understood that those monitoring systems in which an address or data signal is monitored by setting various monitoring time intervals are advantageously applicable also to a multiplex transmission system which employs a unilateral signal transmission path instead of bilateral one.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:

1. A time division multiplexed transmission system comprising:
   a plurality of nodes each respectively connected to control one of a plurality of units of electrical equipment; and
   a signal transmission path for connecting said nodes in a continuous signal communication loop, in which:
   each of said nodes comprises:
     time base measuring means adapted to repetitively measure a time base during which a signal of a unit length at least longer than 2 bits is transmitted to said signal transmission path from one of the nodes;
     transmitting means connected to said signal transmission path for transmitting a prepared signal no shorter than said unit length over said signal transmission path;
     receiving means connected to receive said prepared signal from said signal transmission path;
     controlling means operatively connected to control said transmitting means and said receiving means and connected to control a corresponding one of said units of electrical equipment; and
   each of said nodes being adapted to start to perform signal transmission to said signal transmission path in a predetermined order, wherein:
   each of said nodes further comprises means adapted, whenever having received said prepared signal from any other node than itself, for resetting said time base measuring means to thereby make said time base synchronized with that of said any other node.

2. A time division multiplexed transmission system according to claim 1, wherein:
one of said nodes has an address proper to the one node, and said prepared signal to be transmitted from said transmitting means of the one node to said signal transmission path includes a signal representative of said address; and
the one node further comprises means for determining, depending on an address signal received from any other node, that node which should come next to perform the signal transmission.

3. A time division multiplexed transmission system according to claim 1, wherein:
said prepared signal to be transmitted from said transmitting means to said signal transmission path further includes a data signal of a length proper to the node; and
when a given transmitting node has transmitted said prepared signal to said signal transmission path, the one of said nodes that is next in order of signal transmission transmits a prepared signal to said signal to said signal transmission path when a predetermined unit monitoring time measured by the time base measuring means has elapsed from the time point where said given node has transmitted said prepared signal.

4. A time division multiplexed transmission system according to claim 2, wherein:
said prepared signal of said one node includes said address signal representative of said address proper to said one node, and
said resetting means of said one node resets said time base measuring means of said one node in response to receipt of an address signal from any other node.

5. A time division multiplexed transmission system according to claim 1, wherein:
at least one of said nodes further comprises monitoring timer means adapted to have a monitoring time interval set thereon at a predetermined time point; and
the at least one of said nodes is adapted to rise for transmitting said prepared signal to said signal transmission path at a time point where said monitoring timer means has timed up.

6. A time division multiplexed transmission system according to claim 5, wherein:
said prepared signal to be transmitted from said transmitting means of the at least one of said nodes to said signal transmission path further includes a data signal of a length proper to the transmitting node.

7. A time division multiplexed transmission system according to claim 6, wherein:
said monitoring time interval of each of said nodes comprises an address signal monitoring time interval for monitoring the transmission of said address signal form the node next to perform the signal transmission, the address signal monitoring time interval being set on said monitoring timer means of this node at the time point where this node has received said prepared signal from any other node than this node and at the time point where this node has transmitted said prepared signal of this node and said address signal monitoring time interval having a length proper to this node.

8. A time division multiplexed transmission system according to claim 6, wherein:
said monitoring time interval of each of the at least one of said nodes comprises a data signal monitoring time interval for monitoring the transmission of said data signal from any other node than this node, the data signal monitoring time interval being set on said monitoring timer means of this node at the time point where this node has received said address signal in said prepared signal from said other node, and said data signal monitoring time interval having a length depending on the proper length of said data signal being transmitted from said other node.

9. A time division multiplexed transmission system according to claim 8, wherein:
said monitoring time interval of each of the at lest one of said nodes further comprises an address signal monitoring time interval for monitoring the transmission of said address signal from the node next to perform the signal transmission, the address signal monitoring time interval being set on said monitoring timer means of this node at a time point where a data signal monitoring time interval set on said monitoring timer means of this node has timed up, and said address signal monitoring time interval having a length proper to this node.

10. A time division multiplexed transmission system according to claim 5, wherein:
any of said nodes is adapted to start transmitting said prepared signal thereof at a time point where a predetermined unit monitoring time interval has elapsed from the time point where said monitoring timer means of this node has timed up.

11. A time division multiplexed transimssion system comprising:
a plurality of nodes each respectively connected to control one of a plurality of units of electrical equipment; and
a signal transmission path for connecting said nodes in a continuous communication loop from a transmitting node to the other nodes and back to the transmitting node, in which:
at least one of said nodes comprises:
transmitting means connected to said signal transmission path for transmitting a prepared signal over said signal transmission path;
receiving means connected to said signal transmission path for receiving said prepared signal from said transmission path;
time base measuring means adapted to repetitively measure a time base having a duration of at least two transmission bit times and generate in response thereto a timing control signal indicating signal transmission intervals for said transmitting means;
controlling means operatively connected to receive said timing control signal and to control said transmitting means in response to said timing control signal and to control said receiving means and connected to control as associated one of said units of electrical equipment; and
said at least one of said nodes is adapted to perform signal transmission to said signal transmission path in a predetermined order, wherein:
said at least one of said nodes further comprises means adapted, when having received said prepared signal from any other node than itself, for resetting said time base measuring means to thereby synchronize said time base with a time base of another of said at least one node.

12. A time division multiplexed transmission system comprising:
   a signal transmission path connecting a plurality of nodes in a continuous closed loop from a transmitting node back to the transmitting node;
   said plurality of nodes, each connected to control a differenct associated unit of electrical equipment and including,
      a transmitter connected to transmit a multibit prepared signal onto the signal transmission path;
      a receiver connected to receive the prepared signal from the signal transmission path;
      a timer repetitively measuring a time base interval having a duration of a least two transmission bit times and generating in response thereto a timing control signal indicating signal transmission time intervals for the transmitter;
      a controller connected to receive the timing control signal and to control the transmitter in response thereto and in a predetermined order of transmission among the plurality of nodes, to control the receiver and to control the associated unit of electrical equipments; and
   a synchronizing ciruit coupled to reset the timer in response to receipt by the receiver of a prepared signal transmitted by a different one of the plurality of nodes to thereby synchronize the time base of the node with a time base of said different one of the plurality of nodes.

* * * * *

UNITED STATES PATENT AND TRADEMARK OFFICE
CERTIFICATE OF CORRECTION

PATENT NO. : 4,771,423          Page 1 of 2
DATED : September 13, 1988
INVENTOR(S) : Harutada Ohya et al It is certified that error appears in the above-identified patent and that said Letters Patent is hereby corrected as shown below:

Column 1, line 18, after "of" and before "electrical", insert --units of--.

Column 2, line 9, after "particular" and before "is", "that clock generator" should read --clock generator that--.

Figure 6:
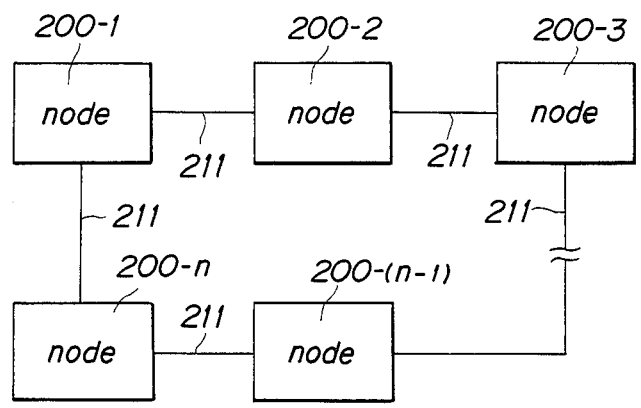
FIG. 6 is a block diagram of the entirety of a time-division multiplex transmission system to be suggested from the level of art, as described.
Figure 7:
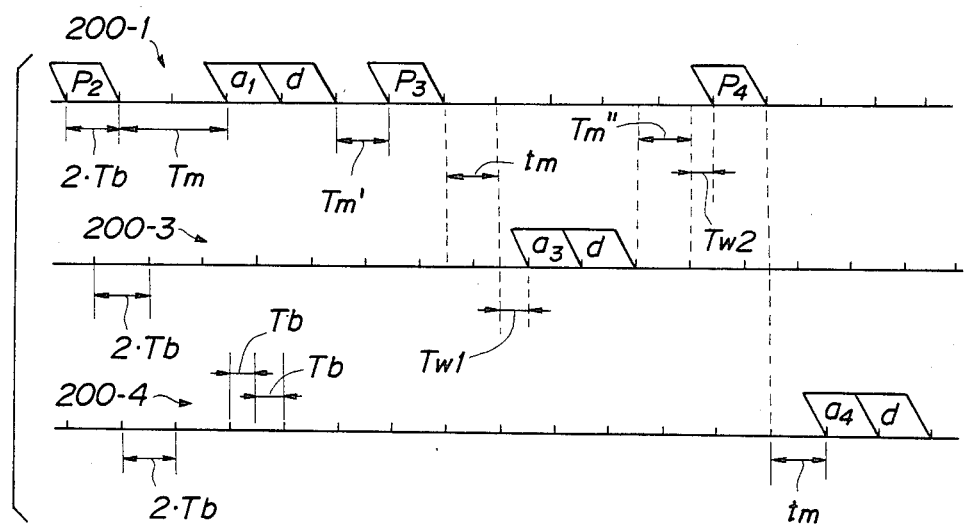
FIG. 7 is a time chart for showing the sequence of various signals to be transmitted from respective nodes to a signal transmission line of the multiplex transmission system of FIG. 6.

Column 2, line 53, after "In" and before "FIG. 6", delete "the".

Column 3, line 46, after "200-n" and before "the" (second occurrence), "recieve" should read --receive--.

Column 5, line 16, after "to" and before "corresponding", ",for controlling," should read --control--.

Column 11, line 65, after "first" and before "rise", insert --to--.

Column 11, line 65, after "rise" and before "." (period), insert --or become active--.

Column 12, line 51, after "addresses" and before "$A_1$ to $A_n$", insert --,-- (comma).

Column 13, line 42, after "node $N_j$", delete "of".

Column 14, line 47, after "interval", "$t_1$" should read --$\frac{1}{2}t_1$--.

Column 15, line 15, after "signal" and before "long", "3-byte" should read --3-bytes--.

Column 15, line 17, after "to" and before "that is", "$4t^1$," should read --$4t_1$,--.

UNITED STATES PATENT AND TRADEMARK OFFICE
CERTIFICATE OF CORRECTION

PATENT NO. : 4,771,423

DATED : September 13, 1988

INVENTOR(S) : Harutada Ohya et al

It is certified that error appears in the above-identified patent and that said Letters Patent is hereby corrected as shown below:

Column 15, line 46, after "is" and before "n-th", insert --the--.

Column 17, line 11, after "tional" and before "first", "interrupt is" should read --interrupts are--.

Column 18, line 3, after "used" and before "abnormalities", "against" should read --for detection of--.

Column 18, line 14, before "from", "$A_{J+1}$" should read --D--.

Column 20, line 12, after "at" and before "node $N_i$", "a ny" should read --any--.

Column 21, line 25, after "time" and before "measured", insert --interval--.

Column 21, line 58, after "signal" and before "the" (first occurrence), "form" should read --from--.

Column 21, line 38, after "claim" and before ", wherein", "1" should read --2--.

Signed and Sealed this

Twenty-third Day of May, 1989

Attest:

DONALD J. QUIGG

Attesting Officer

Commissioner of Patents and Trademarks